US009870669B2

(12) United States Patent
Chosson

(10) Patent No.: US 9,870,669 B2
(45) Date of Patent: Jan. 16, 2018

(54) SECURITY DEVICE FOR SECURITY DOCUMENT

(71) Applicant: ORELL FÜSSLI SICHERHEITSDRUCK AG, Zürich (CH)

(72) Inventor: Sylvain Chosson, Zürich (CH)

(73) Assignee: ORELL FÜSSLI SICHERHEITSDRUCK AG, Zurich (CH)

( * ) Notice: Subject to any disclaimer, the term of this patent is extended or adjusted under 35 U.S.C. 154(b) by 0 days.

(21) Appl. No.: 15/305,991

(22) PCT Filed: Apr. 24, 2014

(86) PCT No.: PCT/CH2014/000053
§ 371 (c)(1),
(2) Date: Oct. 21, 2016

(87) PCT Pub. No.: WO2015/161388
PCT Pub. Date: Oct. 29, 2015

(65) Prior Publication Data
US 2017/0046901 A1 Feb. 16, 2017

(51) Int. Cl.
*G06K 9/74* (2006.01)
*G07D 7/12* (2016.01)
(Continued)

(52) U.S. Cl.
CPC ............... *G07D 7/12* (2013.01); *B42D 25/21* (2014.10); *B42D 25/30* (2014.10); *B42D 25/342* (2014.10);
(Continued)

(58) Field of Classification Search
CPC ............ G06K 9/00046; G06K 9/00013; A61B 5/1172; G07D 7/12; G07D 7/122
(Continued)

(56) References Cited

U.S. PATENT DOCUMENTS 5,085,517 A * 2/1992 Chadwick ............ G01N 21/956
356/394
5,131,755 A * 7/1992 Chadwick .......... G01N 21/8806
356/394
(Continued)

FOREIGN PATENT DOCUMENTS

DE 195 41 064 A1 5/1997
DE 102 60 124 A1 7/2004
(Continued)

OTHER PUBLICATIONS

International Search Report dated Jan. 31, 2013 for International Application No. PCT/CH2012/000073.
(Continued)

*Primary Examiner* — Tarifur Chowdhury
*Assistant Examiner* — Md M Rahman
(74) *Attorney, Agent, or Firm* — Ladas & Parry LLP

(57) ABSTRACT

A security device for verifying an authenticity of a security doc-ument comprises an at least partially transparent mul-tilayer substrate with a first surface and a second surface. A first pattern is arranged on the first surface. This first pattern is derivable using a first seed pattern. A second pattern is arranged on the second surface. This second pattern is derivable using a second seed pattern. The security device furthermore comprises a third pattern arranged between a first and a second substrate layer. The third pattern is derivable using an inversion of the first pattern, an inversion of the second pattern, and a non-inverted third seed pattern. Transmit lances and reflectivities of the patterns are selected such that in a reflection viewing mode, only the first or second seed pattern is visible, respectively. In a transmission viewing mode, only the third seed pattern is visible.

19 Claims, 7 Drawing Sheets

(51) Int. Cl.

| | |
|---|---|
| ***G07D 7/06*** | (2006.01) |
| ***B42D 25/30*** | (2014.01) |
| ***B42D 25/45*** | (2014.01) |
| ***B42D 25/351*** | (2014.01) |
| ***B42D 25/342*** | (2014.01) |
| ***B42D 25/21*** | (2014.01) |
| ***G07D 7/00*** | (2016.01) |

(52) U.S. Cl.
CPC ........... *B42D 25/351* (2014.10); *B42D 25/45* (2014.10); *G07D 7/003* (2017.05); *G07D 7/06* (2013.01)

(58) Field of Classification Search
USPC ........................................................... 356/71
See application file for complete search history.

(56) References Cited

U.S. PATENT DOCUMENTS

| | | | |
|---|---|---|---|
| 5,449,200 A | 9/1995 | Andric et al. | |
| 6,036,233 A | 3/2000 | Braun et al. | |
| 6,089,614 A | 7/2000 | Howland et al. | |
| 6,827,283 B2 | 12/2004 | Kappe et al. | |
| 8,141,908 B2 | 3/2012 | Whiteman et al. | |
| 2006/0197990 A1 | 9/2006 | Myodo et al. | |
| 2010/0164219 A1 | 7/2010 | Jeacock et al. | |
| 2011/0255771 A1* | 10/2011 | Kwon .................. | G06K 9/2018 382/145 |
| 2012/0182443 A1 | 7/2012 | Vincent | |
| 2013/0181435 A1 | 7/2013 | Hersch et al. | |
| 2015/0244727 A1 | 8/2015 | Fournel et al. | |

FOREIGN PATENT DOCUMENTS

| | | |
|---|---|---|
| EP | 0 310 707 A2 | 4/1989 |
| EP | 0 628 408 A1 | 12/1994 |
| EP | 1 580 025 A2 | 9/2005 |
| EP | 2 522 529 A2 | 11/2012 |
| WO | 97/47478 A1 | 12/1997 |
| WO | 98/15418 A1 | 4/1998 |
| WO | 02/27647 A1 | 4/2002 |
| WO | 2009/056351 A1 | 5/2009 |
| WO | 2009/056355 A1 | 5/2009 |
| WO | 2011/007343 A1 | 1/2011 |
| WO | 2014/041298 A2 | 3/2014 |

OTHER PUBLICATIONS

International Preliminary Report on Patentability dated Oct. 1, 2014 for International Application No. PCT/CH2012/000073.
International Search Report and Written Opinion of the International Searching Authority dated Sep. 19, 2014 for International Application No. PCT/CH2013/000230.
International Search Report dated Sep. 19, 2014 for International Application No. PCT/CH2013/000231.
International Preliminary Report on Patentability dated Jun. 28, 2016 for International Application No. PCT/CH2013/000231.
International Search Report and Written Opinion of the International Searching Authority dated Mar. 16, 2015 for International Application No. PCT/CH2014/000053.
International Search Report and Written Opinion of the International Searching Authority dated Feb. 2, 2015 for International Application No. PCT/CH2014/000078.
International Search Report and Written Opinion of the International Searching Authority dated Mar. 16, 2015 for International Application No. PCT/CH2014/000179.
English translation of DE 102 60 124 A1.
espacenet English abstract of WO 2009/056351 A1.
English translation of WO 2009/056351 A1.
espacenet English abstract of EP 2 522 529 A2.
English translation of EP 2 522 529 A2.
espacenet English abstract of WO 2009/056355 A1.
English translation of WO 2009/056355 A1.
English translation of EP 1 580 025 A2.
Chosson, S., et al., "See-through images", Optical Documents Security, 2014, pp. 1-8.
Machizaud, J., et al.. "Spectral transmittance model for stacks of transparencies printed with halftone colors". Color Imaging XII: Processing, Hardcopy and Applications, 2012, 10 pages.
Machizaud, J., et al., "Spectral reflectance and transmittance prediction model for stacked transparency and paper both printed with halftone colors", Optical Society of America, vol. 29, No. 8, Aug. 2012, pp. 1537-1548.

* cited by examiner

Fig. 1 (not claimed)

Fig. 2 (not claimed)

SECURITY DEVICE FOR SECURITY DOCUMENT

CROSS-REFERENCE TO RELATED APPLICATION

This U.S. application claims priority under 35 U.S.C 371 to, and is a U.S. National Phase application of, the International Patent Application No PCT/CH2014/000053, filed 24 Apr. 2014; the entire content of the above-mentioned patent application is incorporated by reference as part of the disclosure of this U.S. application.

TECHNICAL FIELD

The invention relates to a security device for verifying an authenticity of a security document as well as to a security document, e.g., a banknote, a passport, a document of value, a certificate, or a credit card which comprises such a security device. Furthermore, the invention relates to a method for generating patterns for use in such a security device as well as to a method for verifying the authenticity of such a security document.

BACKGROUND ART

US 2006/0197990 A1 discloses a superposition of two tally images, thus revealing a hidden image. The hidden image cannot be reconstructed from a single tally image.

US 2013/0181435 A1, which is incorporated by reference in its entirety, inter alia discloses a model for computing surface coverage in order to obtain a desired color.

WO 2009/056355 A1 discloses a security document with several substrate layers. An information is separated into at least two print excerpts which are printed on at least two different substrate layer surfaces such that the printed print excerpts are laid over each other.

DISCLOSURE OF THE INVENTION

It is an object of the present invention to provide a security device for verifying an authenticity of a security document. Another object of the invention is to provide a method for generating patterns for use in such a security device. Yet another object of the invention is to provide a security document comprising such a security device. Yet another object of the invention is to provide a method for verifying the authenticity of such a security document.

These objects are achieved by the devices and the methods of the independent claims.

Accordingly, a security device for verifying an authenticity of a security document (such as a banknote, a passport, a document of value, a certificate, or a credit card) comprises an at least partially transparent substrate with a first surface and a second surface. The substrate is a multilayer (or "sandwiched") substrate, i.e., it comprises at least a first substrate layer and a second substrate layer.

Herein, the term "at least partially transparent" relates to an optical property of a nonzero transmission of light at at least one wavelength, in particular in the visible regime between 380 nm and 780 nm. Thus, in a transmission viewing mode, a nonzero amount of light can be shone through the substrate. The substrate can be scattering or substantially non-scattering. Advantageously, a transmittance of the substrate is higher than 50%, at least for one transmitted wavelength (which is in particular in the visible regime between 380 nm and 780 nm).

Advantageously, the substrate is flat and/or flexible and/or its thickness is smaller than 500 μm, in particular smaller than 120 μm. The second surface can be on the opposite side of a flat substrate (comprising at least two layers) than the first surface. This simplifies the application in security documents which are usually flat and/or flexible to some degree.

Advantageously, a thickness of the first and/or the second substrate layer is smaller than 250 μm, in particular smaller than 60 μm. This simplifies the application in security documents which are usually flat and/or flexible to some degree.

Furthermore, the security device comprises a first pattern (e.g., a halftone, a grayscale, or a color image) which is arranged on the first surface of the substrate. The first pattern is derivable using a first seed pattern. In other words, the first pattern on the substrate can be generated or derived using the first seed pattern (e.g., a halftone, grayscale, or a color image).

In addition, the security device comprises a second pattern (e.g., a halftone, grayscale, or a color image) which is arranged on the second surface of the substrate. The second pattern is derivable using a second seed pattern. In other words, the second pattern on the substrate can be generated or derived using the second seed pattern (e.g., a halftone, grayscale, or a color image).

To enhance information content in the security device and to thus improve protection against forgery attempts, the security device in addition to the first and second patterns comprises a third pattern which is derivable using the first pattern, using the second pattern, and using a third seed pattern. The third pattern is arranged between the first substrate layer and the second substrate layer.

Usually, each pattern comprises a plurality of distinct regions (e.g., pixels) with a uniform visual appearance in each region. This enhances the information content of the patterns.

According to the invention, transmittances and reflectivities of the first pattern, of the second pattern, of the third pattern, and of the substrate (and/or its respective first and second surfaces) are selected such that in a transmission viewing mode, for at least one transmitted wavelength (in particular in the visible regime between 380 nm and 780 nm) through the first pattern, through the second pattern, through the third pattern, and through the substrate (i.e., through the whole security device), the third seed pattern is visible (i.e., at least some of its information content is reproducible). Brightness levels, contrast levels, and color impressions can be different from those of the third seed pattern, however. Advantageously, in the transmission viewing mode, only the third seed pattern is visible, i.e., not the first and second seed patterns. This enhances the distinctiveness.

As an effect, a transmission-mode-viewer (e.g., a naked eye of a viewer with or without visual aids or a viewing device such as a camera-equipped cellphone) can discern at least some different regions (e.g., pixels) in the visible pattern in the transmission viewing mode such that he can reproduce at least some of the information content of the third seed pattern, e.g., the pattern he acquires in the transmission viewing mode relates to the third seed pattern.

As an example for "visibility", i.e., for a discernibility of different regions in the pattern, e.g., ΔE94-values for the different regions are above 1.8.

Transmittances and reflectivities of the first pattern, of the second pattern, of the third pattern, and of the substrate (and/or its respective first and second surfaces) are furthermore selected such that in a first reflection viewing mode, for at least one reflected wavelength (in particular in the visible regime between 380 nm and 780 nm, the wavelength is advantageously the same wavelength than the transmitted wavelength discussed above) from the first pattern and/or from the first surface, the first seed pattern is visible (i.e., at least some of its information content is reproducible). Brightness levels, contrast levels, and color impressions can be different from those of the first seed pattern, however. Advantageously, in the first reflection viewing mode, only the first seed pattern is visible, i.e., not the second and third seed patterns. This enhances the distinctiveness.

As an effect, a first reflection-mode-viewer (e.g., a naked eye of a viewer with or without visual aids or a viewing device such as a camera-equipped cellphone) can discern at least some different regions (e.g., pixels) in the visible pattern in the first reflection viewing mode such that he can reproduce at least some of the information content of the first seed pattern, e.g., the pattern he acquires in the first reflection viewing mode relates to the first seed pattern.

Transmittances and reflectivities of the first pattern, of the second pattern, of the third pattern, and of the substrate (and/or its respective first and second surfaces) are furthermore selected such that in a second reflection viewing mode, for at least one reflected wavelength (in particular in the visible regime between 380 nm and 780 nm, the wavelength is advantageously the same wavelength than the wavelengths discussed above) from the second pattern and/or from the second surface, the second seed pattern is visible (i.e., at least some of its information content is reproducible). Brightness levels, contrast levels, and color impressions can be different from those of the second seed pattern, however. Advantageously, in the second reflection viewing mode, only the second seed pattern is visible, i.e., not the first and third seed patterns. This enhances the distinctiveness.

As an effect, a second reflection-mode-viewer (e.g., a naked eye of a viewer with or without visual aids or a viewing device such as a camera-equipped cellphone) can discern at least some different regions (e.g., pixels) in the visible pattern in the second reflection viewing mode such that he can reproduce at least some of the information content of the second seed pattern, e.g., the pattern he acquires in the second reflection viewing mode relates to the second seed pattern.

As an effect, according to the invention, the visual appearance and reconstructable information content of the security device is enhanced and the visible features strongly depend on the viewing mode. Thus, security is enhanced considerably.

Advantageously, the first substrate layer and the second substrate layer have different optical properties (such as reflectivities, transmittances, spectral characteristics, scattering properties, etc.), at least in a region or area of the first and/or the second substrate layer in which the first to third patterns are arranged. Thus, more specific effects can be realized and security is enhanced.

Optionally, more than two substrate layers or additional coatings can be provided, as the case may be with the same or different optical properties. These additional substrate layers or coatings can be arranged at any position, i.e., above or below any of the first to third patterns and/or substrate layers.

In an advantageous embodiment of the security device, at least one pattern (in particular all patterns) is applied, in particular printed (e.g., via offset printing, screen printing, or sublimation printing), onto the security device. Thus, the security device can be manufactured more easily.

In another advantageous embodiment, at least one pattern (in particular all patterns) comprises at least one visible ink, i.e., an ink with nonzero absorption properties in the visible regime of the electromagnetic spectrum. Thus, no invisible radiation is necessary for checking the authenticity of the security device. This simplifies authenticity checking.

Optionally, a primer layer can be applied below the first and/or second pattern in order to improve the stability and/or adhesion of the printed inks. This is also possible for the third pattern which is arranged between the substrate layers.

In another advantageous embodiment of the security device, at least one of the group of (in particular all of the group of) the first substrate layer and the second substrate layer is substantially non-scattering at least for the at least one wavelength in the transmission viewing mode. This simplifies the acquisition and reduces distortions of a transmission viewing mode image.

In another advantageous embodiment, at least one of the group of, in particular all of the group of, the first pattern, the second pattern, and the third pattern is arranged on the security device (i.e., the first surface of the first substrate layer and/or the second surface of the second substrate layer and/or a surface between the first and second substrate layers) using laser ablation. Thus, security is enhanced.

More advantageously, laser ablation is combined with any one or more of the above-mentioned printing techniques. Thus, security is enhanced considerably.

In another advantageous embodiment, at least one of the group of the first pattern, the second pattern, and the third pattern is arranged on the security device using foil application techniques. Thus, security is enhanced. This can also be combined with laser ablation and/or printing as discussed above.

In another advantageous embodiment of the security device, the second seed pattern and the third seed pattern are substantially invisible in the first reflection viewing mode. This is particularly then the case when an overall (i.e., spatially integrated over the whole security device) reflected light intensity from the security device outshines an overall (i.e., spatially integrated over the whole security device) transmitted light intensity through the security device at least by a factor of 5. In other words, in this embodiment, a definition for "first reflection viewing mode" is that the overall reflected light intensity from the security device (i.e., from the first surface and from the first pattern) outshines an overall transmitted light intensity through the security device at least by the above-mentioned factor.

Thus, it is easier to select the transmittances and reflectivities such that the above-discussed visual appearance effects occur in the first reflection viewing mode.

In yet another advantageous embodiment of the security device, the first seed pattern and the third seed pattern are substantially invisible in the second reflection viewing mode. This is particularly then the case when an overall reflected light intensity from the security device outshines an overall transmitted light intensity through the security device at least by a factor of 5. In other words, in this embodiment, a definition for "second reflection viewing mode" is that the overall reflected light intensity from the security device (i.e., from the second surface and from the second pattern) outshines an overall transmitted light intensity through the security device at least by the above-mentioned factor.

Thus, it is easier to select the transmittances and reflectivities such that the above-discussed visual appearance effects occur in the second reflection viewing mode.

In yet another advantageous embodiment of the security device, the first seed pattern and the second seed pattern are substantially invisible in the transmission viewing mode. This is particularly then the case when an overall transmitted light intensity through the security device outshines an overall reflected light intensity from the security device at least by a factor of 5. In other words, in this embodiment, a definition for "transmission viewing mode" is that the overall transmitted light intensity through the security device outshines an overall reflected light intensity from the security device at least by the above-mentioned factor.

Thus, it is easier to select the transmittances and reflectivities such that the above-discussed visual appearance effects occur in the transmission viewing mode.

Advantageously, the third pattern is derivable using—in addition to the third seed pattern—an inversion of the first pattern and an inversion of the second pattern.

Herein, the term "inversion", "inverted", and, respectively, "inverted transmittance" and "inverted reflectivity" relate to a transmittance/reflectivity value (e.g., of a pattern or a specific region of a pattern) which is "inverted" with respect to an ideal 100% transmission/reflection at one or more wavelength(s) (in particular in the visible regime between 380 nm and 780 nm) and with respect to another transmittance/reflectivity value (e.g., that of another pattern or region). As examples, for a 90% transmittance of a specific region of the first seed pattern, an inverted transmittance would be 10%. As another example, a 20% reflectivity of a specific region is inverted with respect to an 80% reflectivity.

Thus, it is easier to select the transmittances and reflectivities such that the above-discussed visual appearance effects occur in the transmission viewing mode and in the reflection viewing modes.

A first histogram (i.e., a graph indicative of an absolute or relative frequency-distribution of specific transmittance/reflectivity-values, e.g., gray levels) of the first pattern comprises at least a first unpopulated region and at least a first populated region. In other words, as an example, a first histogram of a first-pattern-gray-level-image comprises unpopulated gray levels, i.e., not all gray levels are present in the image (but some are!). Similarly, a second histogram of the second pattern comprises at least a second unpopulated region and at least a second populated region. The first unpopulated region at least partially, in particular fully, overlaps the second unpopulated region and the first populated region at least partially, in particular fully, overlaps the second populated region.

Thus, it is easier to select the transmittances and reflectivities such that the above-discussed visual appearance effects occur in the transmission viewing mode and in the reflection viewing modes.

In another advantageous embodiment of the security device, the first pattern and/or the second pattern and/or the substrate comprises a color filter. This makes it easier to select one or more transmitted and/or reflected wavelength(s).

There exists at least one corresponding quadruple of pixels which comprises a pixel of the first pattern (with a pixel value d1, e.g., a gray value determining a pixel transmittance and a pixel reflectivity), a pixel of the second pattern (with a pixel value d2, e.g., a gray value determining a pixel transmittance and a pixel reflectivity), a pixel of the third pattern (with a pixel value d3, e.g., a gray value determining a pixel transmittance and a pixel reflectivity), and a pixel of the third seed pattern with a pixel value b (which is to be perceived in the transmission viewing mode). Then, the third pattern (30) is derived such that $$d3 = 1 - \frac{1 - b}{(1 - d1)(1 - d2)}.$$

Thus, it is easier to select the transmittances and reflectivities such that the above-discussed visual appearance effects occur in the transmission viewing mode and in the reflection viewing modes.

As another aspect of the invention, a method for generating a first pattern, a second pattern, and a third pattern for use in a security device as described above comprises steps of

- providing a first seed pattern, e.g., a color, or a grayscale image and
- providing a second seed pattern, e.g., a color, or a grayscale image.

The method comprises a further step of

- setting, if required, a brightness and/or a contrast (for each color channel in the case of color images) of the first seed pattern for yielding the first pattern which is to be arranged on the first surface. A first histogram of the first pattern comprises at least a first unpopulated region and a first populated region.

In other words, as an example, the first histogram of a first-pattern-gray-level-image comprises a first region of unpopulated gray levels (e.g., from 0 to 127) and a first region of populated gray levels (e.g., from 128 to 255). Thus, the example first pattern would appear brighter than the first seed pattern if a first seed pattern's histogram has all gray levels populated. In other words, the first pattern comprises pixel values with not all possible (unpopulated) but with some specific and/or a range of (populated) gray levels. It should be noted that a modification of the brightness and/or contrast is unnecessary, if the first seed pattern already meets the stated histogram requirements.

The method comprises a further step of

- setting, if required, a brightness and/or a contrast of the second seed pattern for yielding the second pattern which is to be arranged on the second surface. A second histogram of the second pattern comprises at least a second unpopulated region and a second populated region.

The first unpopulated region is at least partially, in particular fully, overlapping with the second unpopulated region and the first populated region is at least partially, in particular fully, overlapping with the second populated region. In the above example, both the first-pattern-gray-level-image and a second-pattern-gray-level-image comprise only pixels with gray levels above 128.

The method comprises further steps of

- providing a third seed pattern, e.g., a color, or a grayscale image and
- setting, if required, a brightness and/or a contrast of the third seed pattern for yielding an intermediate pattern. This intermediate pattern is, however, unlike the first pattern and the second pattern not directly to be arranged on the security device (see below). A histogram of the intermediate pattern comprises at least a third unpopulated region and a third populated region. The third unpopulated region is at least partially, in particular fully, overlapping with the first populated region of the first histogram of the first pattern and with the second populated region of the second histogram of the second pattern. Furthermore, the third populated region is at least partially, in particular fully, overlapping with the first unpopulated region and with the second unpopulated region.

In other words, the intermediate pattern, e.g., covers only different gray levels than the first and the second patterns. In the above example, the intermediate pattern could, e.g., cover only gray levels from 0 to 127 (and thus appear darker than the third seed pattern if a third seed pattern's histogram has all gray levels populated).

As a further step, the method comprises a step of deriving the third pattern using the first pattern, the second pattern, and the intermediate pattern (and optionally further optical characteristics such as transmittances/reflectivities of the substrate layers)

that in a transmission viewing mode, for at least one transmitted wavelength through the first pattern, through the second pattern, through the third pattern, and through a substrate (which comprises at least a first substrate layer and a second substrate layer between which the third patterns is to be arranged), the third seed pattern is visible. In other words, the combined transmittances of the first to third patterns as well as of the substrate layers related to the third seed pattern (with a contrast/brightness/color impression degree-of-freedom, see above).

Furthermore, it is ensured that in a first reflection viewing mode, for at least one reflected wavelength from the first pattern and/or from a first surface of the substrate on which the first pattern is to be arranged, the first seed pattern is visible, and that in a second reflection viewing mode, for at least one reflected wavelength from the second pattern and/or from a second surface of the substrate on which the first pattern is to be arranged, the second seed pattern is visible.

In other words, in the first reflection viewing mode, the second and third patterns are at least partially suppressed, and reflectivities of the first pattern and of the first surface yield (with a contrast/brightness/color impression degree-of-freedom) the first seed pattern. In the second reflection viewing mode, the first and third patterns are at least partially suppressed, and reflectivities of the second pattern and of the second surface yield (with a contrast/brightness/color impression degree-of-freedom) the second seed pattern.

Thus, first, second, and third patterns which have transmittances and reflectivities as discussed above are easier to generate and the above-discussed visual appearance effects in the transmission and reflection viewing modes are easier to achieve.

In an advantageous embodiment, the method comprises further steps of halftoning the first pattern and the second pattern, and halftoning the intermediate pattern or the third pattern.

Thus, grayscale images can be applied as halftone-images which simplifies manufacturing of the security device. Halftoning methods can comprise periodical halftoning or statistically independent halftoning.

As another aspect of the invention, a security document (e.g., a banknote, a passport, a document of value, a certificate, or a credit card) comprises a security device as described above. The security device is advantageously arranged in a window (i.e., a transparent region) of (the substrate of) the security document. As an effect, the visual appearance and reconstructable information content of the security document can be more easily made dependent on the viewing mode. Thus, security is enhanced and counterfeiting is considerably aggravated.

Advantageously, such a security document further comprises a light absorber, in particular arranged at a distance to the security device. Then, for example by folding the security document along an applied, in particular printed and/or perforated, folding line, the light absorber can be brought into an overlap with the security device. As an effect, the amount of transmitted and/or reflected light is reduced by the light absorber and thus a reflection viewing mode is reached more easily. As an effect, handling is improved when the authenticity of the security document is to be checked.

Advantageously, the light absorber has a reflectivity of less than 50% at least for the at least one reflected wavelength from the security device and/or the light absorber has a transmittance of less than 50% at least for the at least one transmitted wavelength through the security device. The light absorber can, e.g., comprise a region of the security document which is covered by a dark color, e.g., 100% black. As an effect, the reflection viewing mode of the security device is reached more easily and handling is improved when the authenticity of the security document is to be checked.

As another aspect of the invention, a method for verifying an authenticity of a security document as described above comprises steps of providing the security document which comprises a security device as described above, from a first viewing position acquiring a first image of the security device in a first reflection viewing mode with the first pattern being oriented towards the first viewing position (e.g., with a light absorber being in an overlap with the security device on the second surface), from a second viewing position acquiring a second image of the security device in a second reflection viewing mode with the second pattern being oriented towards the second viewing position (e.g., with a light absorber being in an overlap with the security device on the first surface), and from a third viewing position (which is advantageously the same position as the first viewing position) acquiring a third image of the security device in a transmission viewing mode (e.g., against a ceiling lamp with no light absorber being in an overlap with the security device).

Furthermore, the method comprises a step of deriving the authenticity of the security document using the first image, using the second image, and using the third image.

Because of the specific and different visual appearances in transmission viewing mode (third seed pattern is visible) and reflection viewing modes (first or second seed pattern in visible, respectively), the authenticity of the security document is easier to derive, security is enhanced, and counterfeiting attempts are aggravated.

Advantageously, during the step of acquiring the first image, an overall reflected light intensity from the security device outshines an overall transmitted light intensity through the security device at least by a factor of 5. Thus, the first reflection viewing mode is easier to establish.

Advantageously, during the step of acquiring the second image, an overall reflected light intensity from the security device outshines an overall transmitted light intensity through the security device at least by a factor of 5. Thus, the second reflection viewing mode is easier to establish.

Advantageously, during the step of acquiring the third image, an overall transmitted light intensity through the security device outshines an overall reflected light intensity from the security device at least by a factor of 5. Thus, the transmission viewing mode is easier to establish.

Advantageously, the method comprises a step of bringing a light absorber into an overlap with the security device. Thus, an amount of transmitted light through the security device is reduced and the first or second reflection viewing mode is easier to establish. Then, the step of acquiring the first or second image of the security device is carried out with the light absorber being arranged in the overlap with the security device opposite the respective viewing position. This simplifies the handling of the security document for acquiring the reflection viewing mode image.

Remarks:

The invention is not limited to halftone or grayscale patterns. Although the description and FIGS. herein mainly focus on grayscale patterns for the sake of clarity, analogous considerations can be made for each color channel of color patterns which renders the subject-matter of the invention feasible for color patterns.

The described embodiments similarly pertain to the devices and the methods. Synergetic effects may arise from different combinations of the embodiments although they might not be described in detail.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Figure 1:
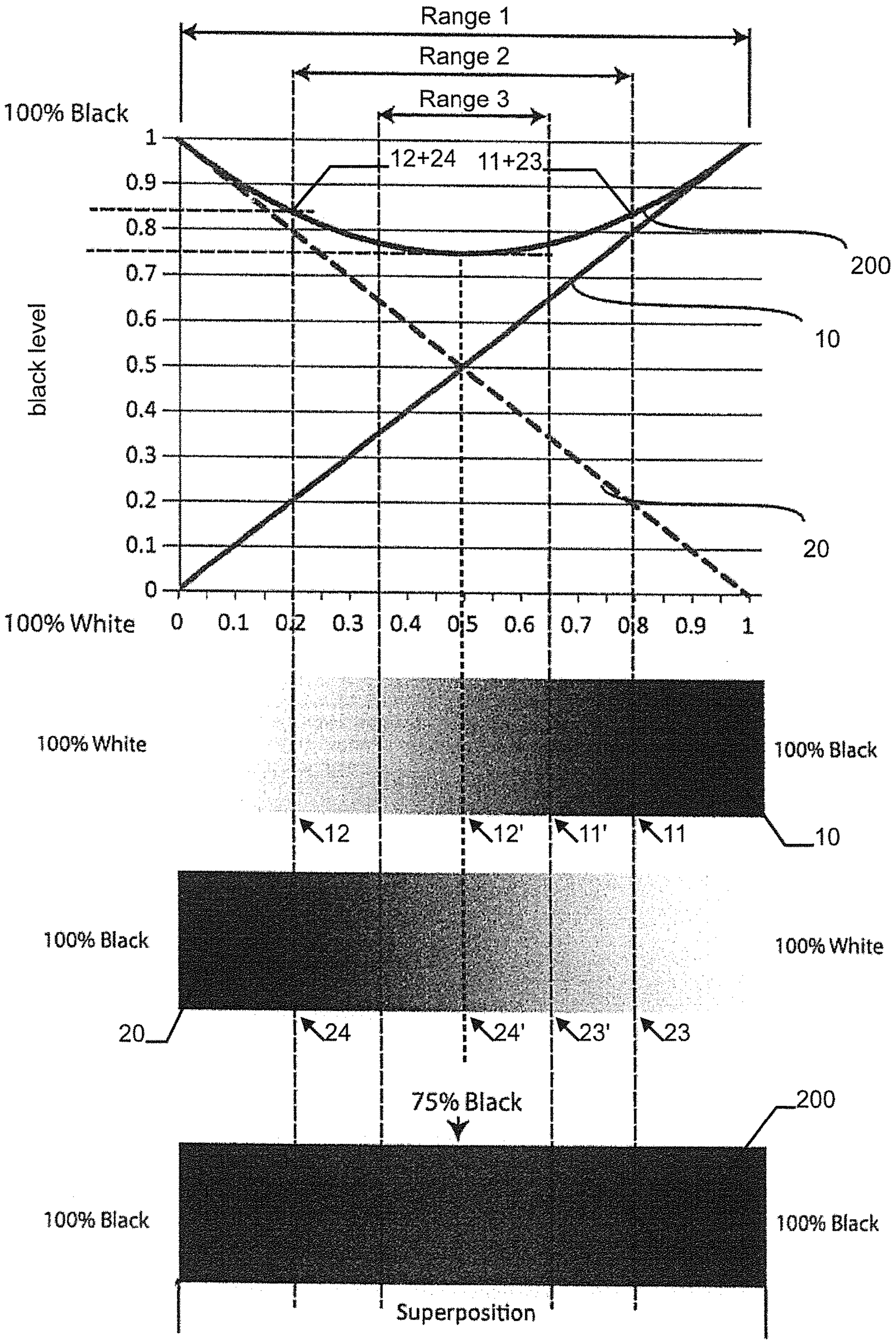
FIG. 1 shows—as a technological background—a first pattern 10 and a second pattern 20 as well as a combination 200 of this first pattern 10 with this second pattern 20 in a transmission viewing mode.

FIG. 1 shows a first pattern 10 and a second pattern 20. In this figure, the first pattern 10 is a grayscale image with a gradient from 100% white (i.e., 0% black) to 100% black (from left to right in a normal viewing position). The second pattern 20 is an inverted pattern with regard to the first pattern 10, i.e., it is a grayscale image with a gradient from 100% black to 0% black (from left to right).

When the first pattern 10 is overlaid with the second pattern 20 (i.e., when a first region 11 of the first pattern 10 fully coincides with a third region 23 of the second pattern 20 and a second region 12 of the first pattern 10 fully coincides with fourth region 24 of the second pattern 20) and viewed in a transmission viewing mode, a grayscale image 200 as depicted in the lower part of FIG. 1 is observed. Specifically, a grayscale image going from 100% black to 75% black back to 100% black is yielded.

The upper part of FIG. 1 shows the black levels of the single patterns 10 and 20 as well as of the combined grayscale image 200 (in transmission viewing mode) as functions of position.

What can be seen from the diagram is that in the transmission viewing mode (i.e., with transmissions through the first and through the second pattern being combined), the first region 11 is indiscernible from the second region 12 of the first pattern 10, because both the first region 11 and the second region 12 show the same gray levels of 84% black (see the points labeled 12+24 and 11+23 of the curve labeled 200 in the diagram).

This is, because the first region 11 of the first pattern 10 fully coincides with the third region 23 of the second pattern 20 (see vertical line). Similarly, the second region 12 of the first pattern 10 fully coincides with the fourth region 24 of the second pattern (see vertical line). Furthermore, the first pattern 10 (i.e., all regions) is inverted with respect to the second pattern 20, i.e., the third region 23 is inverted with respect to the first region 11 and the fourth region 24 is inverted with respect to the second region 12.

One possible theoretical approach to explain this is the so-called Demichel equation. For 2 colors, the Demichel equation shows that for the superposition of a layer of color C1 with a density d1 and of a layer of color C2 with a density d2 (both layers having a random or independent halftoning), a surface coverage of white $w=(1-d1)*(1-d2)$, a perceived color $C1=d1*(1-d2)$, and a perceived color $C2=d2*(1-d1)$.

If both colors C1 and C2 are black and if $d2=1-d1$ (inverted patterns!), the density of black b (i.e., $b=1-w$) for the superposed image equals to $b=1-d1+d12$. This corresponds to the curve labelled 200 in the diagram of FIG. 1.

As an example, the first region 11 of the first pattern 10 and the fourth region 24 of the second pattern 20 are both 80% black. The second region 12 of the first pattern 10 and the third region 23 of the second pattern 20 are both 20% black, i.e., inverted. Hence, the first region 11 has a different transmittance and reflectivity than the second region 12 and the third region 23 has a different transmittance and reflectivity than the fourth region 24. The superposition of the first region 11 with the third region 23 yields b=1−0.8+0.82, i.e., b=84% black. This is the same value as for the superposition of the second region 12 with the fourth region 24, namely b=1−0.2+0.22=84% black. Note that a 100% transmittance of the substrate is assumed here (substrate not shown!).

Thus, in a transmission viewing mode (i.e., in a superposition of the first pattern 10 with the second pattern 20), the first region 11 is indiscernible from the second region 12 and the third region 23 is indiscernible from the fourth region 24.

As can be further seen from the Demichel equation:

With the full range of grayscales (see range 1), the perceived black level of the superposed inversed patterns 10, 20 in transmission viewing mode ranges between a black level b=100% and b=75%.

With a smaller range of grayscales (see range 2) such as 0.2 to 0.8 (i.e., the example above), the perceived black level of the superposed inversed images ranges between b=84% and 75% (horizontal dashed lines).

With an even smaller range of grayscales (see range 3) such as 0.35 to 0.65, the perceived black level of the superposed inversed images ranges between b=77.25% and 75%. This is a range of black levels b where the black levels are not distinguishable by the naked eye of a viewer without visual aids. Thus, in this example, in a transmission viewing mode through first pattern 10 and second pattern 20, a first region 11' would be indiscernible from a second region 12'. In general, it can be stated that regions with transmitted light intensity-differences below 5% cannot be discerned.

If the first pattern 10 is viewed in a reflection viewing mode (e.g., with an overall reflected light intensity from the first pattern 11 outshining an overall transmitted light intensity at least by a factor of 5), the superposition of the first pattern 10 with the second pattern 20 does not take place anymore and the first region 11 thus becomes discernible from the second region 12 due to their different reflectivities. In general, it can be stated that regions with reflected light intensity-differences above 5% can be discerned.

Thus, very specific patterns can be created under different viewing conditions and security is enhanced.

Figure 2:
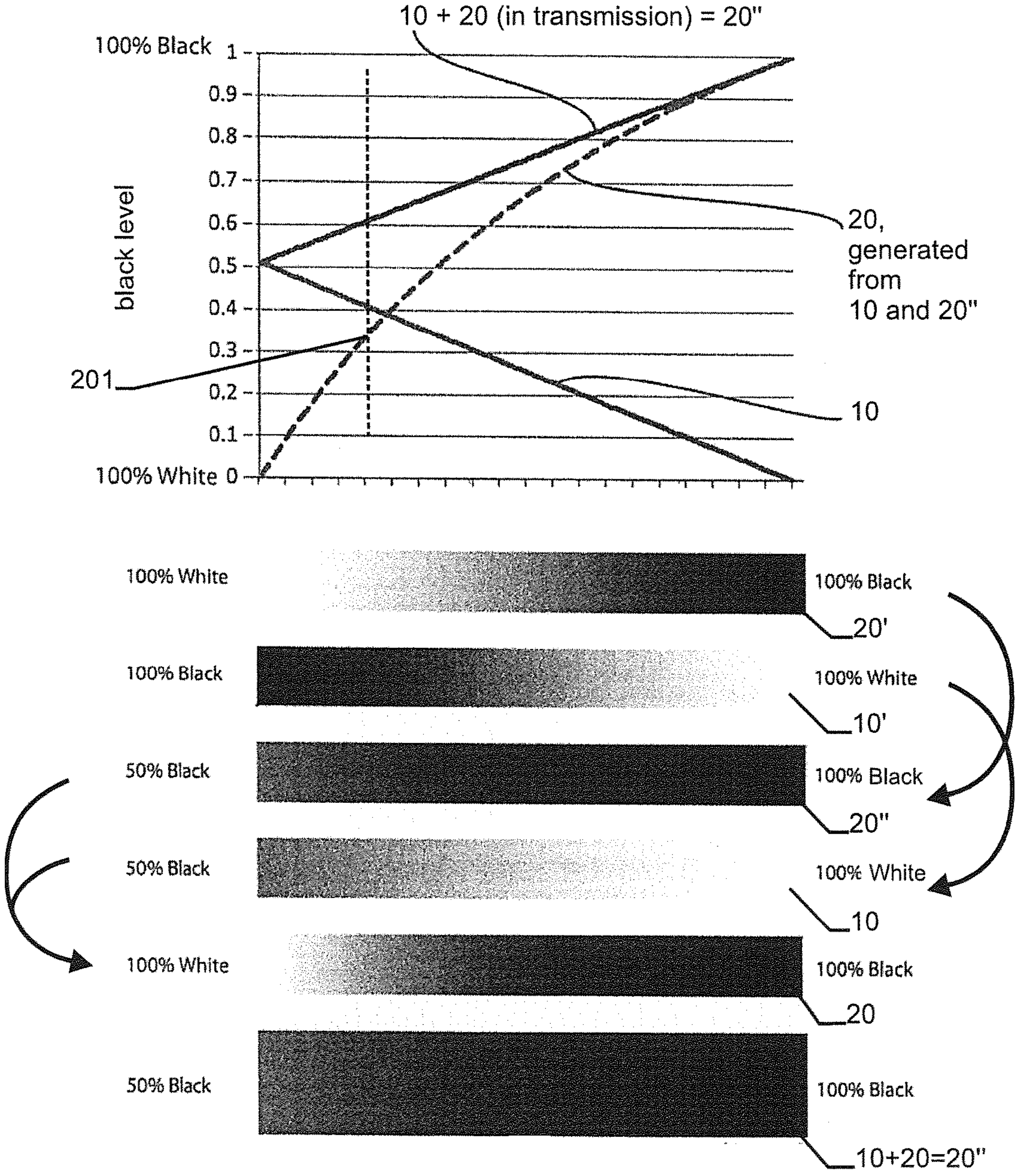
FIG. 2 shows—as a technological background—a generation of a first pattern 10 and of a second pattern 20 using a first seed pattern 10' and a second seed pattern 20', respectively.

While FIG. 1 explains the technological background, in FIG. 2, the generation of a first pattern 10 and of a second pattern 20 is explained.

FIG. 2 shows a second seed pattern 20' from 100% white to 100% black and it shows a first seed pattern 10' from 100% black to 100% white (both as seen from left to right). So far, the situation is the same as discussed above with regard to FIG. 1.

Now, here, instead of overlaying these seed patterns 10' and 20' directly, the brightness and contrast of the second seed pattern 20' is set to ensure that all grayscale levels are darker than 50% black. In other words, a histogram is compressed. Thus, an intermediate pattern 20" is yielded. In other words, in a histogram of this intermediate pattern 20", only black levels between 50% black and 100% black are populated while the gray levels between 0% black and 50% black are unpopulated (i.e., only regions with gray values between 50% black and 100% black are present in the intermediate pattern 20").

Furthermore, the brightness and contrast of the first seed pattern 10' is set as to ensure that all grayscale levels are brighter than 50% black. Thus, the first pattern 10 is yielded. In other words, in a histogram of this first pattern 10, only black levels between 0% black and 50% black are populated while the gray levels between 50% black and 100% black are unpopulated.

Now, as a next step, a second pattern 20 is generated using the first pattern 10 and the intermediate pattern 20". The second pattern 20 in FIG. 2 is created such that in a transmission viewing mode in combination with the first pattern 10, the intermediate pattern 20" is yielded when a perfect 100% transmittance of a substrate (not shown) is assumed. This intermediate pattern 20", however, corresponds to the second seed pattern 20' with the exception of a modified brightness and contrast.

The diagram at the top of FIG. 2 shows these relations.

This last step of generating the second pattern 20 is carried out by using the Demichel equation as explained above with regard to FIG. 1. Specifically, the Demichel equation as introduced above for a layer of color C1 (black in this case) with a density d1 and of a layer of color C2 (black in this case) with a density d2 tells how to do this generation step: It states that $$b=1-(1-d1)*(1-d2)=1-(1-d2-d1+d2d1)$$

$$b=d1+d2-d1*d2$$

Here, b is again indicative of the perceived density of black for the transmission-superposed pattern 10+20=20".

In other words, the black level in a specific region of the to be generated second pattern 20 can be calculated by $$d2=1-[(1-b)/(1-d1)]$$

For an example, please refer to the dashed vertical line in the diagram on top of FIG. 2: In the specific region of the patterns, the first pattern 10 has a gray level of 40%. Now, the task is to find a second pattern 20 (i.e., its gray level in this region) that combines (in transmission) with the first pattern to yield a gray level of 60% (i.e., the gray level of the intermediate pattern 20" in the respective region). So, with b= 0.6 and d1=0.4, it follows that $$d2=1-[(1-0.6)/(1-0.4)]=0.33=33\% \text{ black}$$

This corresponds to point 201 on the pattern-20-curve in the diagram of FIG. 2.

For a pattern generation rule, it needs to be imposed that d2>=0. This leads to $$(1-b)/(1-d1)\leftarrow 1 \text{ or}$$

$$d1\leftarrow b.$$

This means, however, that a gray level of any region of the first pattern 10 (i.e., d1) is always brighter than a corresponding gray level of a region of the intermediate pattern 20" at the same position. For this to be taken into account, the step of histogram-compression as described above is used (if necessary).

In the examples herein, two equal ranges for d1 (i.e., black levels in the first pattern 10) and b (i.e., black levels in the intermediate pattern 20") such as 0-50% for d1 and 50%-100% for b are selected. Other ranges are possible as well.

As an effect, first pattern 10 and second pattern 20 are easier to generate.

The same principle for pattern generation also applies to an overlay of three patterns (first pattern, second pattern, third pattern, e.g., arranged between first pattern and second pattern):

In an example, for every quadruple of pixels (i.e., corresponding pixels in the first pattern, second pattern, third pattern, and third seed pattern):

$$b=1-[(1-1)*(1-d2)*(1-d3)]$$

Here, b is again indicative of the perceived density of black for the superposition of the patterns in a transmission viewing mode (i.e., through an overlay of all three patterns), d1 is the black density of the first pattern's pixel, d2 is the density of the second pattern's pixel, and d3 is the (to be derived) density of black of the (to be derived) third pattern's pixel, respectively.

Then:

$$d3 = 1 - \frac{1-b}{(1-d1)(1-d2)}$$

Because $0 \Leftarrow d3 \Leftarrow 1$, we need to have $$0 \leq \frac{1-b}{(1-d1)(1-d2)} \leq 1$$

and thus:

$$(1-b) \Leftarrow (1-d1)(1-d1)$$

Note that d2=0 give the same result as for the two patterns as discussed above.

Please also note that the above discussed approach also works in two dimensions (for pixelates 2d images) as well as for color images:

Demichel equation in CMYK:

Ccyan=dcyan×(1−dmagenta)×(1−dyellow)×(1−dblack)

Cmagenta=dmagenta×(1−dcyan)×(1−dyellow)×(1−dblack)

Cyellow=dyellow×(1−dcyan)×(1−dmagenta)×(1−dblack)

Ccyanmagenta=dcyan×dmagenta×(1−dyellow)×(1−dblack)

Ccyanyellow=dcyan×(1−dmagenta)×dyellow×(1−dblack)

Cmagentayellow=dmagenta×(1−dcyan)×dyellow×(1−dblack)

If cyanmagentayellow=black

Cblack=(1−dcyan)×(1−dmagenta)×(1−dyellow)×dblack
+dcyan×dmagenta×dyellow×(1−dblack)
+dcyan×dmagenta×dyellow×dblack
+dcyan×(1−dmagenta)×(1−dyellow)×dblack
+dmagenta×(1−dcyan)×(1−dyellow)×dblack
+dyellow×(1−dcyan)×(1−dmagenta)×dblack
+dcyan×dmagenta×(1−dyellow)×dblack
+dcyan×(1−dmagenta)×dyellow×dblack
+dmagenta×(1−dcyan)×dyellow×dblack Cwhite=(1−dcyan)×(1−dmagenta)×(1−dyellow)×(1−dblack)

Figure 3:
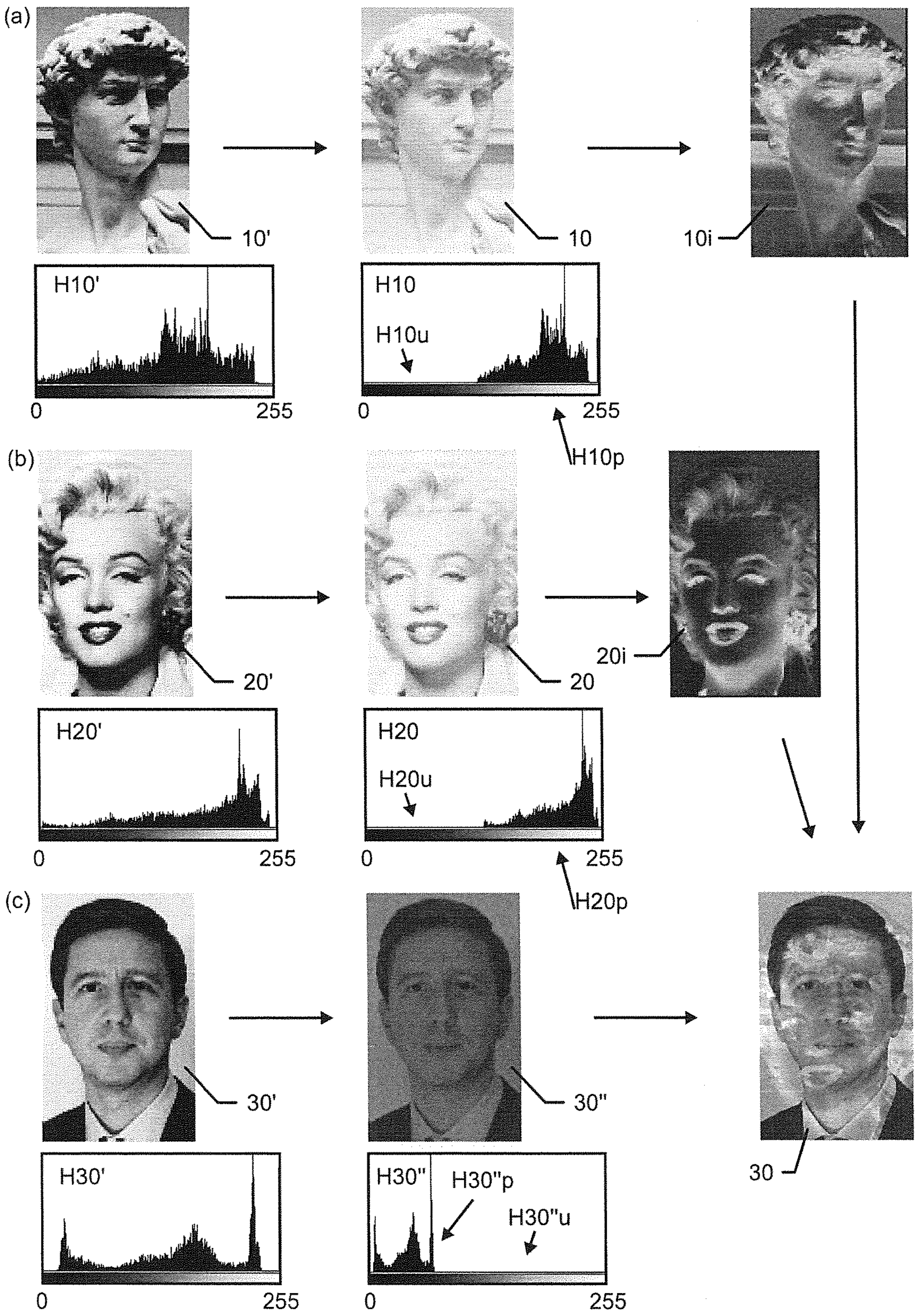
FIG. 3 shows a first seed pattern 10', a first pattern 10 for use in a security device 1 according to the invention, a second seed pattern 20', a second pattern 20 for use in a security device 1 according to the invention, a third seed pattern 30', an intermediate pattern 30", and a third pattern 30 for use in a security device 1 according to the invention.

With regard to FIG. 3 the above-described principles are applied to generate a first pattern 10, a second pattern 20, and a third pattern 30 for use in a security device 1 according to the invention.

FIG. 3*a* shows a first seed pattern 10' ("David") and a first pattern 10 which is derived therefrom for use in a security device 1 according to the invention. As it can be seen in the lower part of FIG. 3*a*, a histogram H10' of the first seed pattern 10' is compressed such that a histogram H10 of the thus yielded first pattern 10 comprises a first unpopulated region H10*u* and a first populated region H10*p*. This is achieved by setting a brightness and/or a contrast of the first seed pattern 10', if necessary. Specifically here, the first pattern 10 appears brighter than the first seed pattern 10'. Note, that this "setting" step is unnecessary if the first seed pattern H10' already fulfills the necessary criteria. The first pattern 10 is later arranged, e.g., printed using visible inks, onto a first surface 3 of a multilayer substrate 2 of a security device 1 according to the invention (see below).

Furthermore, the first pattern 10 is inverted to yield an inverted first pattern 10*i* which is later used for generating the third pattern 30 for use in the security device 1 according to the invention.

FIG. 3*b* shows the same steps as described above with regard to FIG. 3*a* for a second pattern 20 for use in the security device 1 according to the invention. This second pattern 20 is derived from a second seed pattern 20' ("Marilyn", histogram H20') such that a second histogram H20 of the second pattern 20 comprises at least a second unpopulated region H20*u* and a second populated region H20*p*.

The first unpopulated region H10*u* overlaps the second unpopulated region H20*u* and the first populated region H10*p* overlaps the second populated region H20*p*. The second pattern 20 is later arranged, e.g., printed using visible inks, onto a second surface 4 of a multilayer substrate 2 of a security device 1 according to the invention (see below). A second inverted pattern 20*i* is later used for generating the third pattern 30.

FIG. 3*c* shows a third seed pattern 30' ("inventor", histogram H30') from which an intermediate pattern 30" is derived by setting/compressing the histogram H30' of the third seed pattern 30' such that a histogram H30" of the yielded intermediate pattern 30" comprises a third unpopulated region H30"*u* and a third populated region H30"*p*. The third unpopulated region H30"*u* overlaps the first and second populated regions H10*p* and H20*p*. The third populated region H30"*p* overlaps the first unpopulated region H10*u* and the second unpopulated region H20*u*. Thus, a third pattern 30 with the described visual effects is easier to derive.

Unlike the first pattern 10 and the second pattern 20, the intermediate pattern 30" is not directly applied onto the security device 1, but a third pattern 30 for use in the security device 1 according to the invention is derived from the first pattern 10 (specifically, from its inversion 10*i*), from the second pattern 20 (specifically, from its inversion 20*i*), and from the intermediate pattern 30". This is done in such a way

- that in a transmission viewing mode (i.e., in a superposition of the first pattern 10, the second pattern 20, and the third pattern 30), only a pattern related to the third seed pattern 30' is visible (with a contrast/brightness/color impression degree-of-freedom, see above). This is achieved because the first pattern 10 and a contribution in the third pattern 30 cancel each other just as the second pattern 20 and another contribution in the third pattern 30. The approach is based on the Demichel equation discussed above with regard to FIGS. 1 and 2.
- In a first reflection viewing mode with the first pattern 10 being oriented towards a viewing position, only a pattern related to the first seed pattern 10' is visible (with a contrast/brightness/color impression degree-of-freedom, see above).
- In a second reflection viewing mode with the second pattern 20 being oriented towards the viewing position, only a pattern related to the second seed pattern 20' is visible (with a contrast/brightness/color impression degree-of-freedom, see above).

By arranging the thus created first pattern 10, the second pattern 20, and the third pattern 30 on a security device 1, information content in the security device 1 is increased, the perceived information content depends on the specific viewing modes, and counterfeiting attempts are thus aggravated. Thus, security is enhanced considerably.

Note: As it is demonstrated, e.g., in PCT/CH2013/000231 (which is hereby incorporated by reference in its entirety), in FIG. 6*b* and the corresponding description on page 23 et seq., lines 28 et seq., the use of halftoning techniques (not shown here) can simplify the manufacturing of the security device 1.

Figure 4:
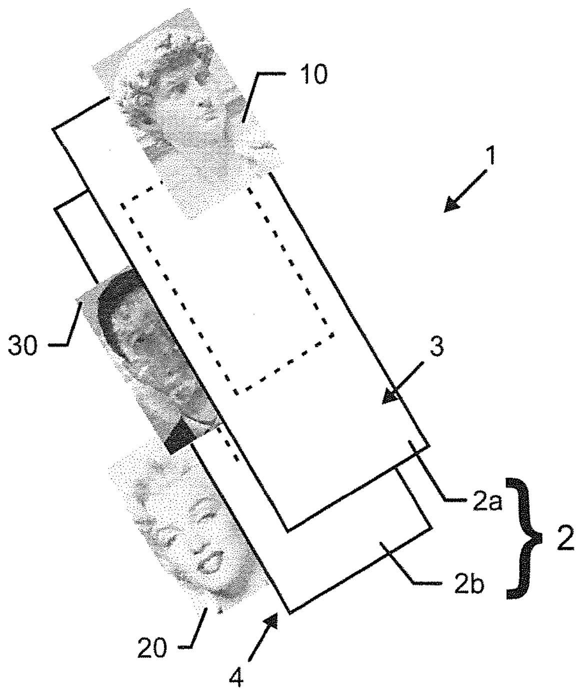
FIG. 4 shows a security device 1 according to a first embodiment of the invention, the security device 1 comprising a multilayer substrate 2 as well as a first pattern 10, a second pattern 20, and a third pattern 30, FIG. 5 schematically shows the security device 1 of FIG. 4 in a first reflection viewing mode, FIG. 6 schematically shows the security device 1 of FIG. 4 in a second reflection viewing mode, FIG. 7 schematically shows the security device 1 of FIG. 4 in a transmission viewing mode.

FIG. 4 shows a security device 1 according to a first embodiment of the invention, the security device 1 comprising a multilayer substrate 2 which comprises a first substrate layer 2*a* and a second substrate layer 2*b*. The security device 1 further comprises the first pattern 10 of FIG. 3 arranged on a first surface 3 of the first substrate layer 2*a*. The second pattern 20 of FIG. 3 is arranged on a second surface 4 of the second substrate layer 2*b*. The third pattern 30 of FIG. 3 is arranged between the first substrate layer 2*a* and the second substrate layer 2*b* of the security device 1. Because of the high registration accuracy necessary for arranging the first to third patterns 10, 20, 30 on the security device 1, counterfeiting attempts of the security device 1 are aggravated. Both substrate layers 2*a* and 2*b* have substantially the same optical properties.

Figure 5:
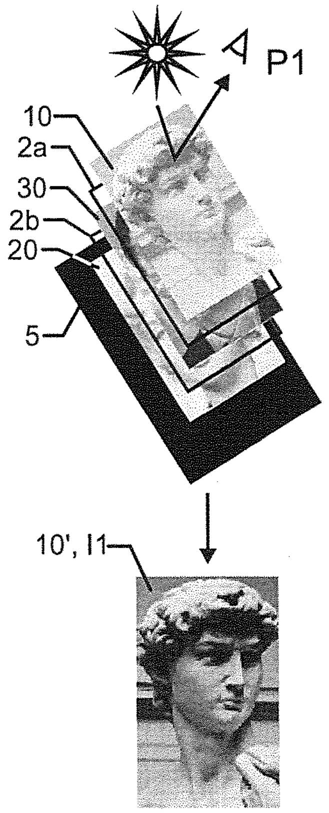

FIG. 5 schematically shows the security device 1 of FIG. 4 in a first reflection viewing mode. In this first reflection viewing mode, the first pattern 10 is oriented towards a first viewing position P1 and a light absorber 5 is in overlap with the security device 1 facing the second pattern 20. Thus, an overall reflected light intensity from the security device 1 outshines an overall transmitted light intensity at least by a factor of 5. From the first viewing position P1, a first image I1 is acquired (e.g., by a viewer's naked eye) which relates to the first seed pattern 10' ("David").

Figure 6:
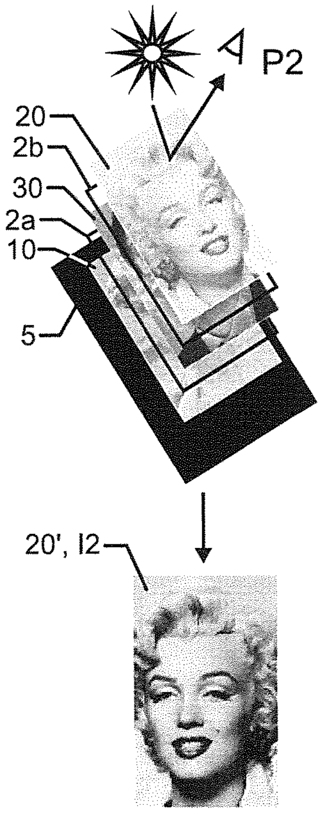

FIG. 6 schematically shows the security device 1 of FIG. 4 in a second reflection viewing mode. In this second reflection viewing mode, the second pattern 20 is oriented towards a second viewing position P2 and a light absorber 5 is in overlap with the security device 1 facing the first pattern 10. Thus, an overall reflected light intensity from the security device 1 outshines an overall transmitted light intensity at least by a factor of 5. From the second viewing position P2, a second image I2 is acquired (e.g., by a viewer's naked eye) which relates to the (mirrored) second seed pattern 20' ("Marilyn").

Figure 7:
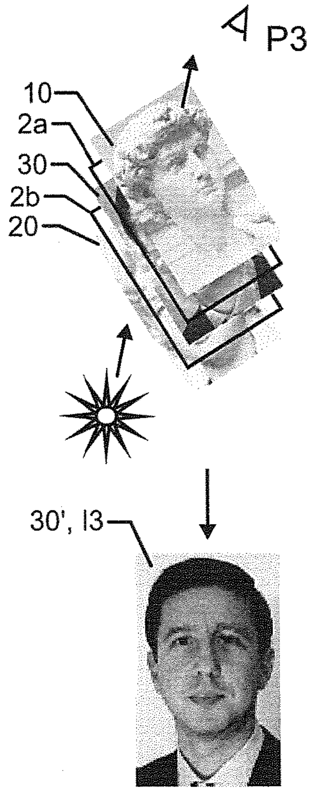

FIG. 7 schematically shows the security device 1 of FIG. 4 in a transmission viewing mode. In this transmission viewing mode, the first pattern 10 is oriented towards a third viewing position P3 and a light source is facing the second pattern 20. Thus, an overall transmitted light intensity through the security device 1 outshines an overall reflected light intensity from the security device 1 at least by a factor of 5. From the third viewing position P3, a third image I3 is acquired (e.g., by a viewer's naked eye) which relates to the third seed pattern 30' ("inventor"). It should be noted here that a transmission viewing ode in which the second pattern 20 faces the third viewing position P3 would obtain the same resulting third image I3 with the exception of a mirroring of the "inventor"-image.

Thus, very specific visual effects are created and the security is enhanced.

Figure 8:
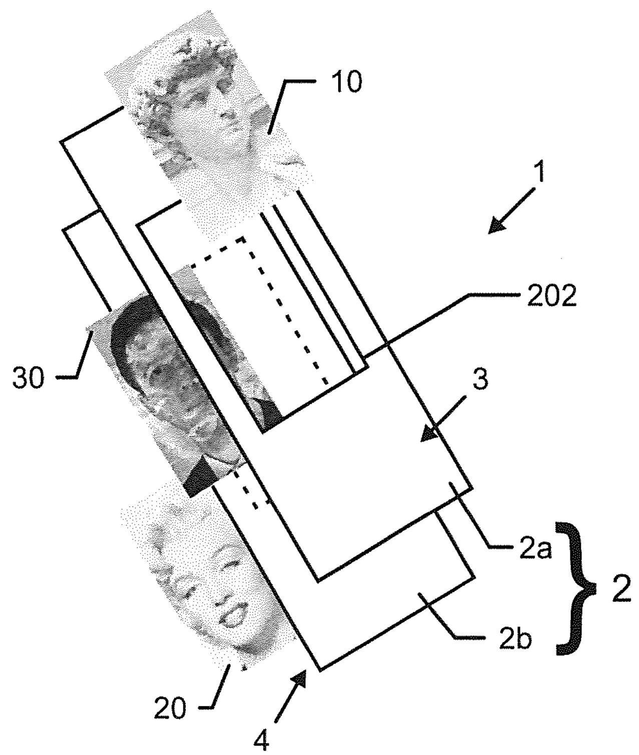
FIG. 8 shows a security device 1 according to a second embodiment of the invention, wherein a first substrate layer 2*a* of a multilayer substrate 2 of the security device 1 comprises a transparent window, FIG. 9 schematically shows a security document 100 comprising the security device 1 of FIG. 4, a light absorber 5, and a folding line 500, FIG. 10 schematically shows the security device 1 of FIG. 4 in a transmission viewing mode, FIG. 11 schematically shows the security device 1 of FIG. 4 in a first reflection viewing mode with specular reflection, and FIG. 12 schematically shows the security device 1 of FIG. 4 in a first reflection viewing mode with specular reflection and pattern attenuation by a light absorber 5.

FIG. 8 shows a security device 1 according to a second embodiment of the invention. This security device 1 is very similar to the first embodiment described above with regard to FIG. 4 with the difference that the first substrate layer 2*a* comprises a fully transparent window 202 in the area of the first substrate layer 2*a* in which the first and the third patterns 10, 30 are arranged. This further aggravates counterfeiting attempts. Note that as an alternative or in addition, it is also possible to arrange a fully transparent window on the second substrate layer 2*b* in the area in which the second and the third patterns 20, 30 are arranged (not shown).

Figure 9:
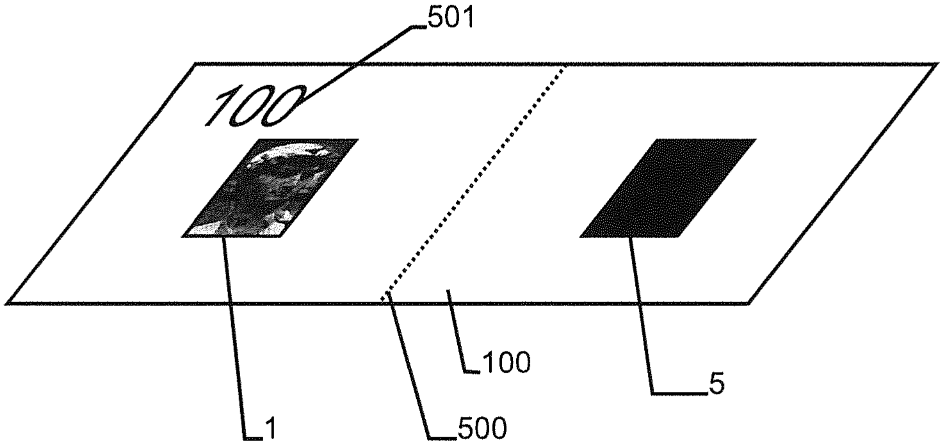

FIG. 9 schematically shows a security document 100 (a banknote with a denomination 501) comprising the security device 1 of FIG. 4. The security device 1 is arranged in a window of the security document 100 and a light absorber 5 consisting of a region with 100% black is arranged at a distance to the security device 1. If the security document 100 is folded along a perforated and printed folding line 500, the light absorber 5 can be brought into overlap with the security device 1 facing the first pattern 10 or the second pattern 20, respectively. Thus, a first or second reflection viewing mode is easier to achieve (also see below for attenuation effects).

Figure 10:
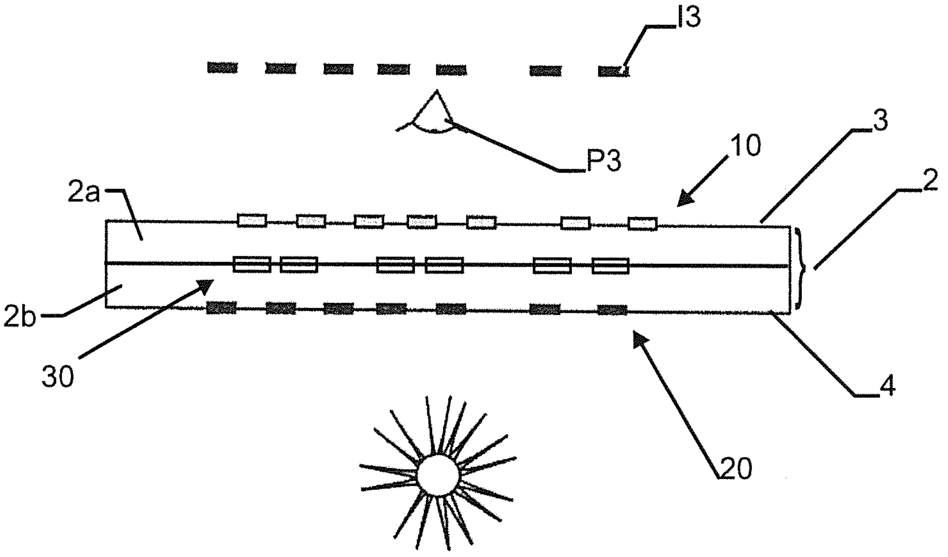

FIG. 10 schematically shows the security device 1 of FIG. 4 in a transmission viewing mode. The security device 1 comprises the multilayer substrate 2 with the first surface 3 and the second surface 4. The first pattern 10 ("David") is arranged on the first surface 3 (only schematically shown). The second pattern 20 ("Marilyn") is arranged on the second surface 4 (only schematically shown). The third pattern 30 ("inventor"+further contributions, generated using the first pattern 10, using the second pattern 20, and using the third seed pattern 30' (see above)) is arranged between a first substrate layer 2*a* and a second substrate layer 2*b* (only schematically shown). In a transmission viewing mode (image I3 at a viewer's third viewing position P3), for at least one transmitted wavelength through the security device, only the third seed pattern 30' ("inventor") is visible because the contributions of "David" and "Marilyn" are invisible in the transmission viewing mode due to the specific generation of the third pattern 30. This is according to the Demichel equation as discussed above. In other words, the first pattern 10 ("David") and the second pattern 20 ("Marilyn") are invisible in the transmission viewing mode, because combined perceived grayscale differences for the "David" and "Marilyn" pixels are the same or at least below discernible thresholds, just as the regions 11' and 12' in FIG. 1.

Figure 11:
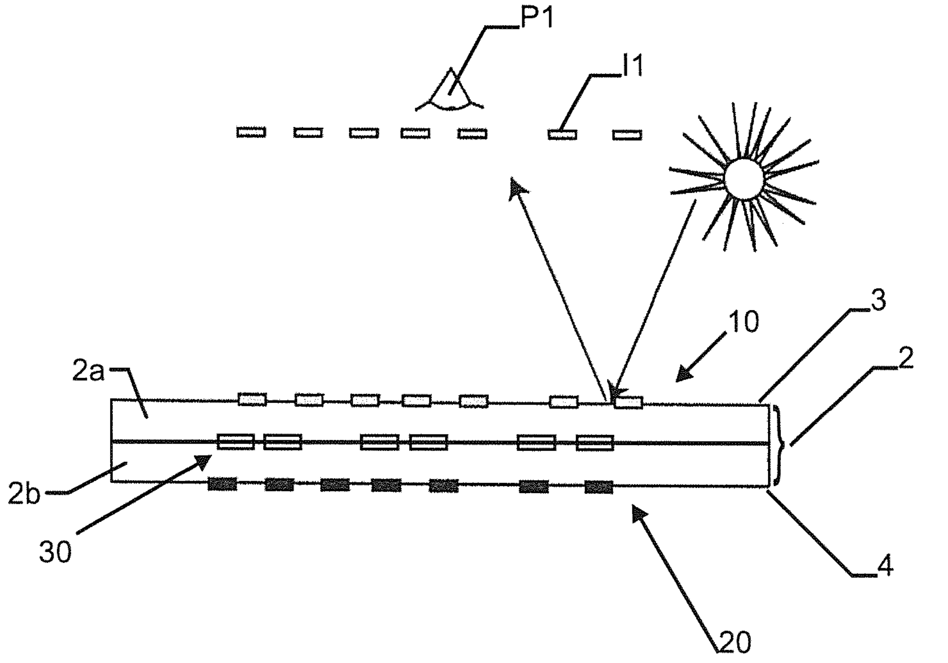

FIG. 11 schematically shows the security device 1 of FIG. 4 in a first reflection viewing mode with specular reflection only. In such a reflection viewing mode (image I1 at a viewer's first viewing position P1), for at least one (specularly by the first surface 3) reflected wavelength from the first pattern 10 and/or from the first surface 3, only the first pattern 10 ("David") is visible. This is because, in this model, almost all light is reflected from the first pattern 10 and/or from the first surface 3. Thus, the third pattern 30 as well as the second pattern 20 do not interact with the light.

Figure 12:
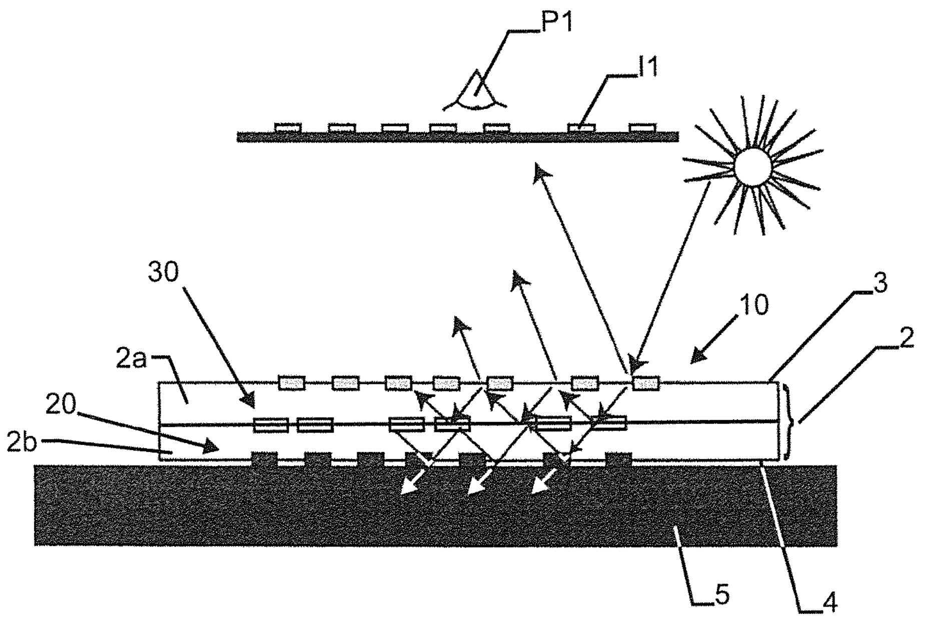

FIG. 12 schematically shows the security device 1 of FIG. 4 in a first reflection viewing mode with specular reflection and pattern attenuation which is facilitated by a light absorber 5. The situation is essentially the same as in FIG. 11, but in addition to only specular reflection on the first surface 3 and/or the first pattern 10, a light absorber 5 is arranged facing the second surface 4 and the second pattern 20. This light absorber 5 helps to attenuate the third pattern

30 and the second pattern 20. This is due to the propagation of light and the multiple reflections of the light inside the substrate 2.

Remark:

While there are shown and described presently preferred embodiments of the invention, it is to be distinctly understood that the invention is not limited thereto but may be otherwise variously embodied and practiced within the scope of the following claims.

Further aspects of the security device are, that at least one of the group of, in particular all of the group of, the first pattern (10), the second pattern (20), and the third pattern (30) is arranged on the security device (1) using laser ablation of the substrate (2), and/or a thickness of the substrate layer (2) is smaller than 500 μm, in particular smaller than 120 μm, and/or a thickness of the first substrate layer (2*a*) is smaller than 250 μm, in particular smaller than 60 μm and/or wherein a thickness of the second substrate layer (2*b*) is smaller than 250 μm, in particular smaller than 60 μm.

The invention claimed is:

1. A security device for verifying an authenticity of a security document, the security device comprising an at least partially transparent substrate with a first surface and a second surface, wherein the substrate comprises at least a first substrate layer and a second substrate layer, a first pattern arranged on the first surface of the substrate, wherein the first pattern is derivable using a first seed pattern, a second pattern arranged on the second surface of the substrate, wherein the second pattern is derivable using a second seed pattern, a third pattern arranged between the first substrate layer and the second substrate layer, which third pattern is derivable using the first pattern, the second pattern, and a third seed pattern, wherein for each corresponding quadruple of pixels comprising a pixel of the first pattern with a pixel value d1, a pixel of the second pattern with a pixel value d2, a pixel of the third pattern with a pixel value d3, and a pixel of the third seed pattern with a pixel value b, the third pattern is derived such that $$d3 = 1 - \frac{1-b}{(1-d1)(1-d2)}$$

wherein transmittances and reflectivities of the first pattern, of the second pattern, of the third pattern, and of the substrate are selected such that in a transmission viewing mode, for at least one transmitted wavelength through the first pattern, through the second pattern, through the third pattern, and through the substrate, the third seed pattern is visible, that in a first reflection viewing mode, for at least one reflected wavelength from the first pattern and from the first surface, the first seed pattern is visible, and that in a second reflection viewing mode, for at least one reflected wavelength from the second pattern and from the second surface, the second seed pattern is visible, wherein a first histogram of the first pattern comprises at least a first unpopulated region and at least a first populated region, and wherein a second histogram of the second pattern comprises at least a second unpopulated region and at least a second populated region, and wherein the first unpopulated region at least partially overlaps the second unpopulated region and wherein the first populated region at least partially overlaps the second populated region.

2. The security device of claim 1 wherein, in the transmission viewing mode, only the third seed pattern is visible and/or wherein, in the first reflection viewing mode, only the first seed pattern is visible and/or wherein, in the second reflection viewing mode, only the second seed pattern is visible.

3. The security device of claim 1 wherein an optical property of the first substrate layer differs from an optical property of the second substrate layer, at least in an area of the first and/or the second substrate layer in which area the first, the second, and the third patterns are arranged.

4. The security device of claim 1 wherein the transmitted wavelength in the transmission viewing mode, the reflected wavelength in the first reflection viewing mode, and the reflected wavelength in the second reflection viewing mode are substantially the same.

5. The security device of claim 1 wherein at least one of the group of, in particular all of the group of, the transmitted wavelength in the transmission viewing mode, the reflected wavelength in the first reflection viewing mode, and the reflected wavelength in the second reflection viewing mode is between 380 nm and 780 nm.

6. The security device of claim 1 wherein at least one of the group of, in particular all of the group of, the first pattern, the second pattern, and the third pattern comprises at least one visible ink.

7. The security device of claim 1 wherein at least one of the group of, in particular all of the group of, the first pattern, the second pattern, and the third pattern comprises an image, in particular a grayscale image, a color image, or a halftone image.

8. The security device of claim 1 wherein at least one of the group of, in particular all of the group of, the first pattern, the second pattern, and the third pattern is printed onto the security device using offset printing, screen printing, or sublimation printing.

9. The security device of claim 1 wherein at least one of the group of in particular all of the group of, the first substrate layer and the second substrate layer is substantially non-scattering at least for the at least one wavelength in the transmission viewing mode.

10. The security device of claim 1 wherein the second seed pattern and the third seed pattern are substantially invisible in the first reflection viewing mode, in particular when an overall reflected light intensity from the security device outshines an overall transmitted light intensity through the security device at least by a factor of 5.

11. The security device of claim 1 wherein the first seed pattern and the third seed pattern are substantially invisible in the second reflection viewing mode, in particular when an overall reflected light intensity from the security device outshines an overall transmitted light intensity through the security device at least by a factor of 5.

12. The security device of claim 1 wherein the first seed pattern and the second seed pattern are substantially invisible in the transmission viewing mode, in particular when an overall transmitted light intensity through the security device outshines an overall reflected light intensity from the security device at least by a factor of 5.

13. The security device of claim 1 wherein the third pattern is derivable using an inversion of the first pattern, using an inversion of the second pattern, and using the third seed pattern.

14. A security document, wherein the security document comprises a security device of claim 1, in particular arranged in a window of the security document.

15. The security document of claim 14, further comprising a light absorber, in particular arranged at a distance to the security device.

16. The security document of claim 15 wherein the light absorber has a reflectivity of less than 50% and/or a transmittance of less than 50%.

17. The security document of claim 14, wherein the security document is one of the group comprising a banknote, a passport, a document of value, a certificate, or a credit card.

18. The security device of claim 1, wherein the security device is one of the group comprising a banknote, a passport, a document of value, a certificate, or a credit card.

19. A method for generating a first pattern, a second pattern, and a third pattern for use in a security device of claim 1, the method comprising steps of providing a first seed pattern, providing a second seed pattern, providing a third seed pattern, setting a brightness and/or a contrast of the first seed pattern for yielding the first pattern, wherein a first histogram of the first pattern comprises at least a first unpopulated region and a first populated region, setting a brightness and/or a contrast of the second seed pattern for yielding the second pattern, wherein a second histogram of the second pattern comprises at least a second unpopulated region and a second populated region, setting a brightness and/or a contrast of the third seed pattern for yielding an intermediate pattern, wherein a histogram of the intermediate pattern comprises at least a third unpopulated region and a third populated region, wherein the first unpopulated region is at least partially, in particular fully, overlapping with the second unpopulated region and wherein the first populated region is at least partially, in particular fully, overlapping with the second populated region, and wherein the third unpopulated region is at least partially, in particular fully, overlapping with the first unpopulated region and the second populated region, and wherein the third unpopulated region is at least partially, in particular fully, overlapping with the first unpopulated region and the second populated region, wherein for each corresponding quadruple of pixels comprising a pixel of the first pattern with a pixel value d1, a pixel of the second pattern with a pixel value d2, a pixel of the third pattern with a pixel value d3, and a pixel of the third seed pattern with a pixel value b, the third pattern is derived such that $$d3 = 1 - \frac{1-b}{(1-d1)(1-d2)}$$

deriving, using the first pattern, the second pattern, and the intermediate pattern, the third pattern such that in a transmission viewing mode, for at least one transmitted wavelength through the first pattern, through the second pattern, through the third pattern, and through a substrate comprising at least a first substrate layer and a second substrate layer between which the third pattern is arrangeable, the third seed pattern is visible, that in a first reflection viewing mode, for at least one reflected wavelength from the first pattern and from a first surface of the substrate on which the first pattern is arrangeable, the first seed pattern is visible, and that in a second reflection viewing mode, for at least one reflected wavelength from the second pattern and from a second surface of the substrate on which the first pattern is arrangeable, the second seed pattern is visible.

* * * * *